US011908590B2

(12) United States Patent
Bars

(10) Patent No.: US 11,908,590 B2
(45) Date of Patent: Feb. 20, 2024

(54) SELF SHIELDED CYCLOTRON RADIATION PATCH

(71) Applicant: Dana-Farber Cancer Institute, Inc., Boston, MA (US)

(72) Inventor: Erol Bars, Exeter, NH (US)

(73) Assignee: Dana-Farber Cancer Institute, Inc., Boston, MA (US)

( * ) Notice: Subject to any disclaimer, the term of this patent is extended or adjusted under 35 U.S.C. 154(b) by 449 days.

(21) Appl. No.: 17/295,726

(22) PCT Filed: Nov. 19, 2019

(86) PCT No.: PCT/US2019/062117
§ 371 (c)(1),
(2) Date: May 20, 2021

(87) PCT Pub. No.: WO2020/106670
PCT Pub. Date: May 28, 2020

(65) Prior Publication Data

US 2022/0005623 A1 Jan. 6, 2022

Related U.S. Application Data

(60) Provisional application No. 62/769,930, filed on Nov. 20, 2018.

(51) Int. Cl.
*G21F 1/08* (2006.01)
*G21F 1/10* (2006.01)

(52) U.S. Cl.
CPC . *G21F 1/08* (2013.01); *G21F 1/10* (2013.01)

(58) Field of Classification Search
CPC ... G21F 1/08; G21F 1/10; G21F 7/005; G21F 3/00; E02D 27/44
See application file for complete search history.

(56) References Cited

U.S. PATENT DOCUMENTS 4,497,768 A * 2/1985 Caldwell .............. G01N 23/221 976/DIG. 231
5,083,029 A * 1/1992 Buchanan ............ G01N 23/204 250/390.05

(Continued)

FOREIGN PATENT DOCUMENTS

WO WO-2020/106670 A1 5/2020

OTHER PUBLICATIONS

Extended European Search Report for EP Application No. 19888069.2 dated Jul. 5, 2022.

(Continued)

*Primary Examiner* — David A Vanore
(74) *Attorney, Agent, or Firm* — Dana-Farber Cancer Institute, Inc.

(57) ABSTRACT

A shielding apparatus for a radioisotope production system is provided. The shielding apparatus is capable of being retro-fitted to the housing of preinstalled radioisotope production systems. The shielding apparatus comprises a plurality of shield layers removably stacked on top of a base that is mounted to the top of the housing via spacers defining space or air gap between the base and housing. The shield layers and base are positioned above and extending between the interface between moveable shields and a moveable base of the radioisotope production system, such that the shielding apparatus is positioned within the trajectory of a radioisotope production system beam.

20 Claims, 7 Drawing Sheets

(56) References Cited

U.S. PATENT DOCUMENTS

| | | | | |
|---|---|---|---|---|
| 6,051,185 | A | 4/2000 | Beers | |
| 10,123,406 | B1 | 11/2018 | Melin et al. | |
| 11,549,258 | B2 * | 1/2023 | Shields | E04B 1/19 |
| 2005/0218347 | A1 | 10/2005 | Williamson et al. | |
| 2006/0039522 | A1 * | 2/2006 | Bars | H05H 6/00 376/166 |
| 2008/0308754 | A1 | 12/2008 | Fehrenbacher et al. | |
| 2011/0101254 | A1 | 5/2011 | Yajima et al. | |
| 2012/0196147 | A1 * | 8/2012 | Rabiei | C22C 38/40 2/2.5 |
| 2013/0020512 | A1 * | 1/2013 | Roy | G21F 3/00 250/506.1 |
| 2015/0101275 | A1 * | 4/2015 | Lefkus, III | E04H 3/08 52/741.1 |
| 2016/0038669 | A1 * | 2/2016 | Bars | A61M 5/008 600/432 |
| 2020/0194139 | A1 * | 6/2020 | Ford | G21F 7/00 |
| 2021/0316062 | A1 * | 10/2021 | Bars | G21H 5/02 |
| 2021/0327600 | A1 * | 10/2021 | Bars | G21K 5/08 |
| 2021/0329772 | A1 * | 10/2021 | Bars | G21G 1/10 |
| 2022/0005623 | A1 * | 1/2022 | Bars | G21F 7/005 |
| 2022/0034244 | A1 * | 2/2022 | Bars | G21F 9/02 |

OTHER PUBLICATIONS

International Search Report and Written Opinion for International Application No. PCT/US2019/062117 dated Jan. 15, 2020.

* cited by examiner

SELF SHIELDED CYCLOTRON RADIATION PATCH

CROSS-REFERENCE TO RELATED APPLICATIONS

This application is the U.S. national phase of International Patent Application No. PCT/US19/62117, filed on Nov. 19, 2019, which claims the benefit of U.S. Provisional Application No. 62/769,930, filed Nov. 20, 2018, the entire contents of each of which is hereby incorporated by reference in its entirety.

BACKGROUND

The disclosed subject matter relates to a system for shields used with cyclotrons for shielding against radiation. Particularly, the present disclosed subject matter is directed to a removable shield assembly including a plurality of layered shield elements, which can be retro-fitted onto existing cyclotron systems.

The present disclosure is directed towards the field of Positron Emission Tomography (PET), which includes imaging and measuring physiologic processes by injecting radioisotopes into a patient to assist in diagnosing and assessing disease progression/treatment. A cyclotron or particle accelerator is used to produce the radioisotopes. Conventional cyclotrons accelerate the particle beam and thereafter collide or bombard a target material (e.g. solid, liquid or gaseous) which is housed in a target holder or container of the cyclotron. The generation of the radioisotope results presents a health risk to the operators near the cyclotron, which in turn requires that adequate precautions be taken to protect or shield the operators from radiation exposure.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

In accordance with the purpose of the disclosed subject matter, as embodied and broadly described, there is provided a shielding apparatus for a radioisotope production system. The radioisotope production system has a housing comprising stationery and moveable shields configured for relative movement therebetween. The shielding apparatus comprises: a base having a top surface and a bottom surface defining a width therebetween one or more spacers and at least one shield layer. The at least one shield layer is disposed on the top surface of the base. The at least one spacer attaches the base to the housing with a gap between the bottom surface of the base and the housing; wherein the at least one shield layer is removably attached to the base.

In some embodiments, a plurality of shield layer is stacked symmetrically on top of the base. In some embodiments, the at least one shield layer includes a plurality of homogenous shield layers, and the shield layer(s) can be disposed above the moveable shield throughout the range of motion of the moveable shield.

In some embodiments, the base and shield layer(s) extend across the interface between the moveable shields and stationery shield, with the base and shield layer(s) disposed within a trajectory of a cyclotron radiation beam.

In some embodiments, all the spacers are disposed on the stationery shield.

In some embodiments, all the spacers are disposed on the moveable shields.

In some embodiments, the base is removably attached to the housing.

In some embodiments, the at least one shield layer shields against neutron and gamma radiation. In some embodiments, the at least one shield layer is formed from borated polyethylene. In some embodiments, the at least one shield layer is configured as a rectangular plate.

In some embodiments, the gap between the bottom surface of the base and the housing is a constant distance. In some embodiments, the gap between the bottom surface of the base and the housing is a varied distance.

In some embodiments, the gap between the bottom surface of the base and the housing is approximately 2-6 inches at a first location of the base.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION

Figure 1:
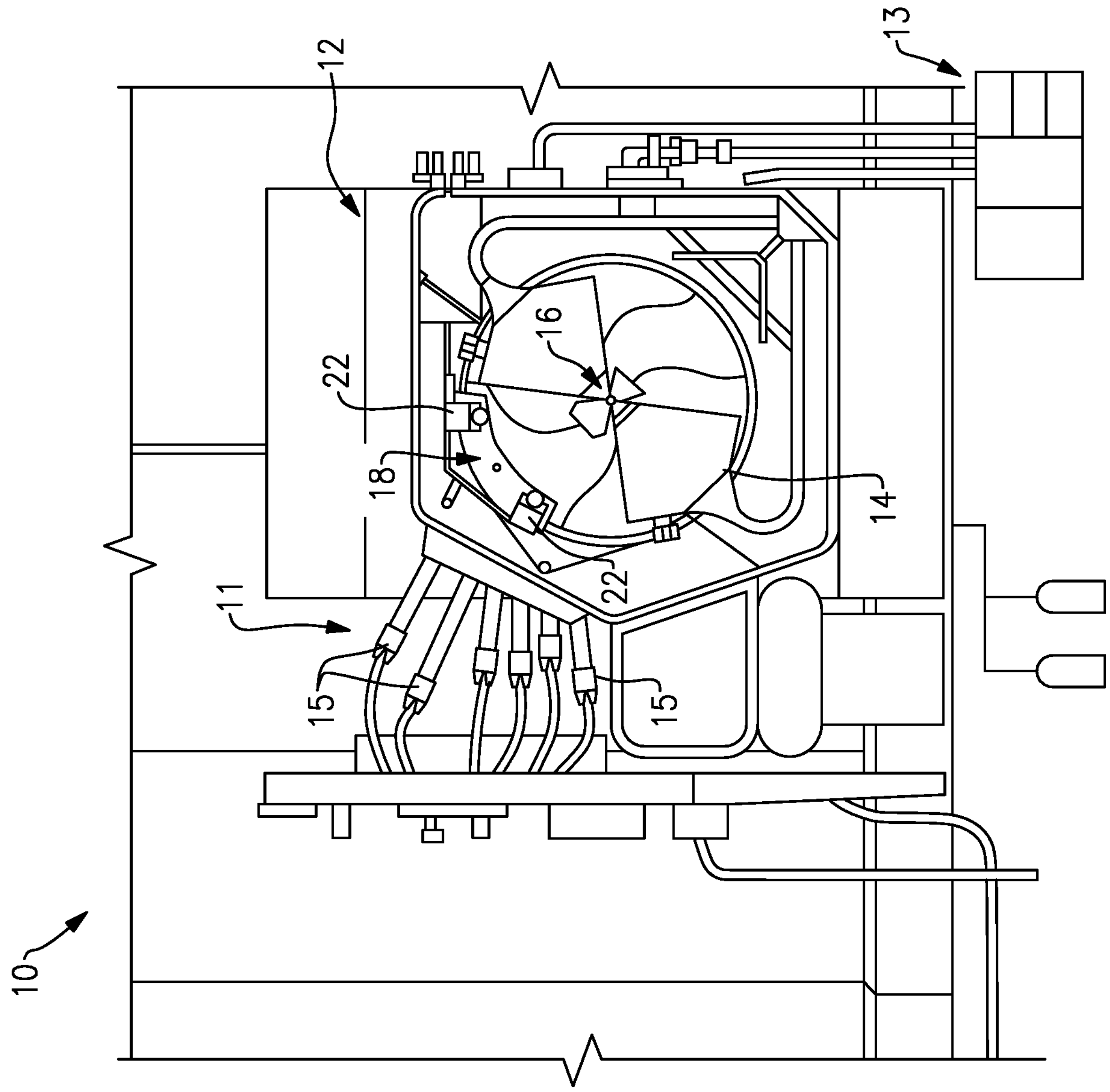
FIG. 1 is a schematic representation of a cross-section of a portion of a conventional radioisotope production system.

Reference will now be made in detail to exemplary embodiments of the disclosed subject matter as illustrated in the accompanying drawings. Similar reference numerals (differentiated by the leading numeral) may be provided among the various views and Figures presented herein to denote functionally corresponding, but not necessarily identical components.

There is provided a shielding apparatus configured to be disposed relative to a conventional radioisotope production system. A radioisotope production system receives the output from a cyclotron, which is a type of particle accelerator in which a beam of charged particles (e.g., H− charged particles or D− charged particles) are accelerated outwardly along a spiral orbit. The cyclotron directs the beam into a target material to generate the radioisotopes (or radionuclides). Cyclotrons are known in the art, and an exemplary cyclotron is disclosed in U.S. Pat. No. 10,123,406, the entirety of which, including structural components and operational controls, is hereby incorporated by reference.

One such conventional radioisotope production system is shown in FIG. 1. In radioisotope production system 10, a particle beam is directed through cyclotron 18 along a beam transport path (not shown) and into targeting system 11 so that the particle beam is incident upon the designated target material (solid, liquid or gas). In the configuration shown, the target system 11 includes six potential target locations 15, however a greater/lesser number of target locations 15 can be employed as desired. Similarly, the relative angle of each target location 15 relative to cyclotron 18 can be varied (e.g. each target location 15 can be angled over a range of 0°~90° with respect to a horizontal axis in FIG. 2). Additionally, the radioisotope production system 10 and cyclotron 18 can be configured to direct the particle beam along different paths toward the target locations 15.

Figure 2:
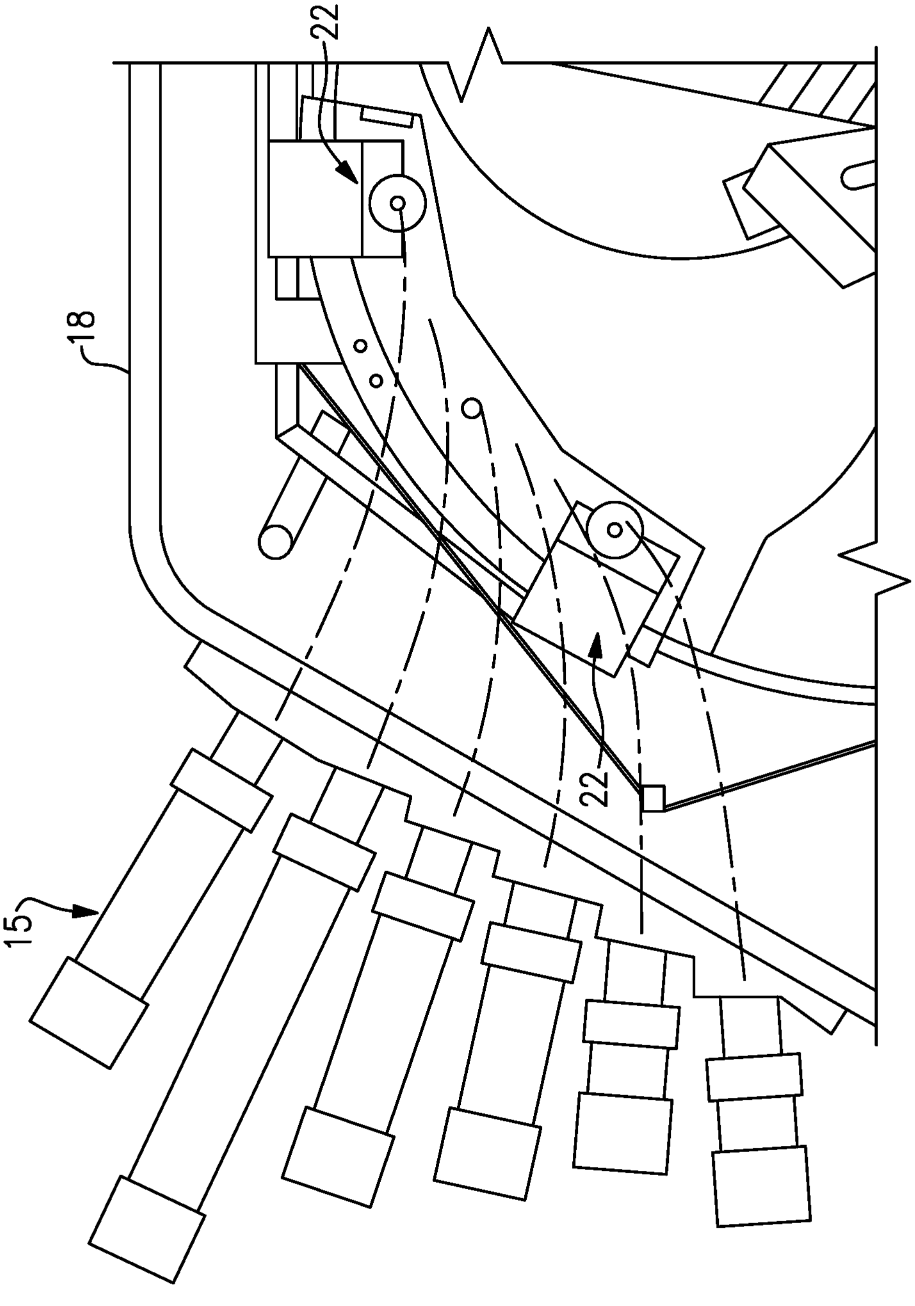
FIG. 2 is a close-up, schematic representation of the portion of the conventional radioisotope production system shown in FIG. 1.

FIG. 2 is a close-up, schematic representation of a side view of the portion of the radioisotope production system shown in FIG. 1, showing cyclotron 18 and target system 11. As shown in FIG. 2, cyclotron 18 includes first and second extraction units 22. The extraction process can include stripping the electrons of the charged particles (e.g., the accelerated negative charged particles) as the charged particles pass through an extraction foil—where the charge of the particles is changed from a negative charge to a positive charge thereby changing the trajectory of the particles in the magnet field. Extraction foils may be positioned to control a trajectory of particle beam 25 that includes the positively-charged particles and may be used to steer particle beam 25 toward designated target locations 15. Target locations 15 can include solid, liquid or gas targets.

In general, cyclotrons accelerate charged particles (e.g., hydrogen ions) using a high-frequency alternating voltage. A perpendicular magnetic field causes the charged particles to spiral in a circular path such that the charged particles re-encounter the accelerating voltage many times. The magnetic field maintains these ions in a circular trajectory and a D-shaped electrode assembly creates a varying RF electric field to accelerate the particles. As noted above, cyclotron 18 further includes one or more extraction systems 22 that consist of a stripper foil (not shown). The stripper foil changes the ion polarity to positive and directs the positively charged ions to hit a target material (not shown) contained in a target container (not shown) according to a target selection setting.

Figure 3:
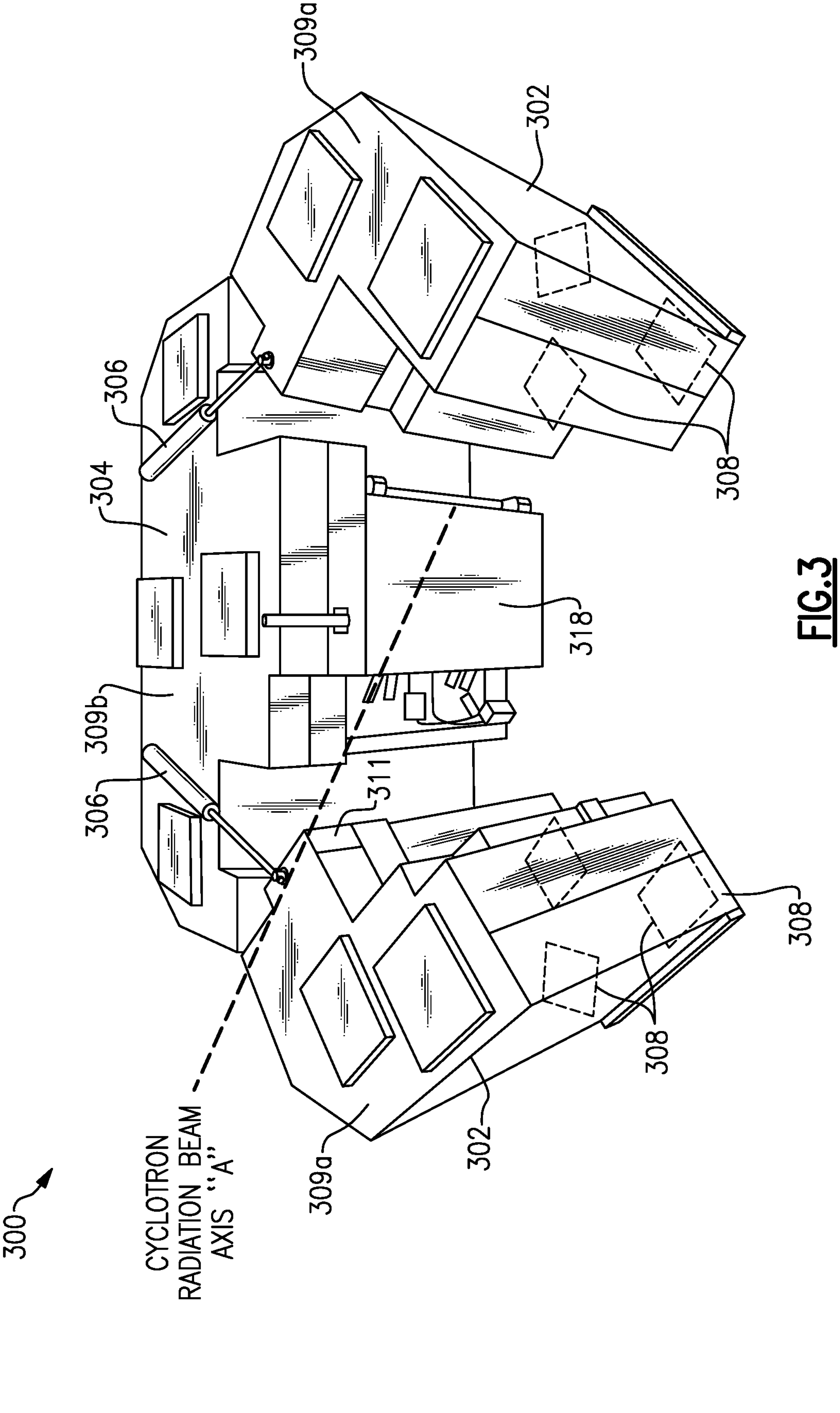
FIG. 3 is a schematic representation of a conventional radioisotope production system, shown in an open configuration.
Figure 4:
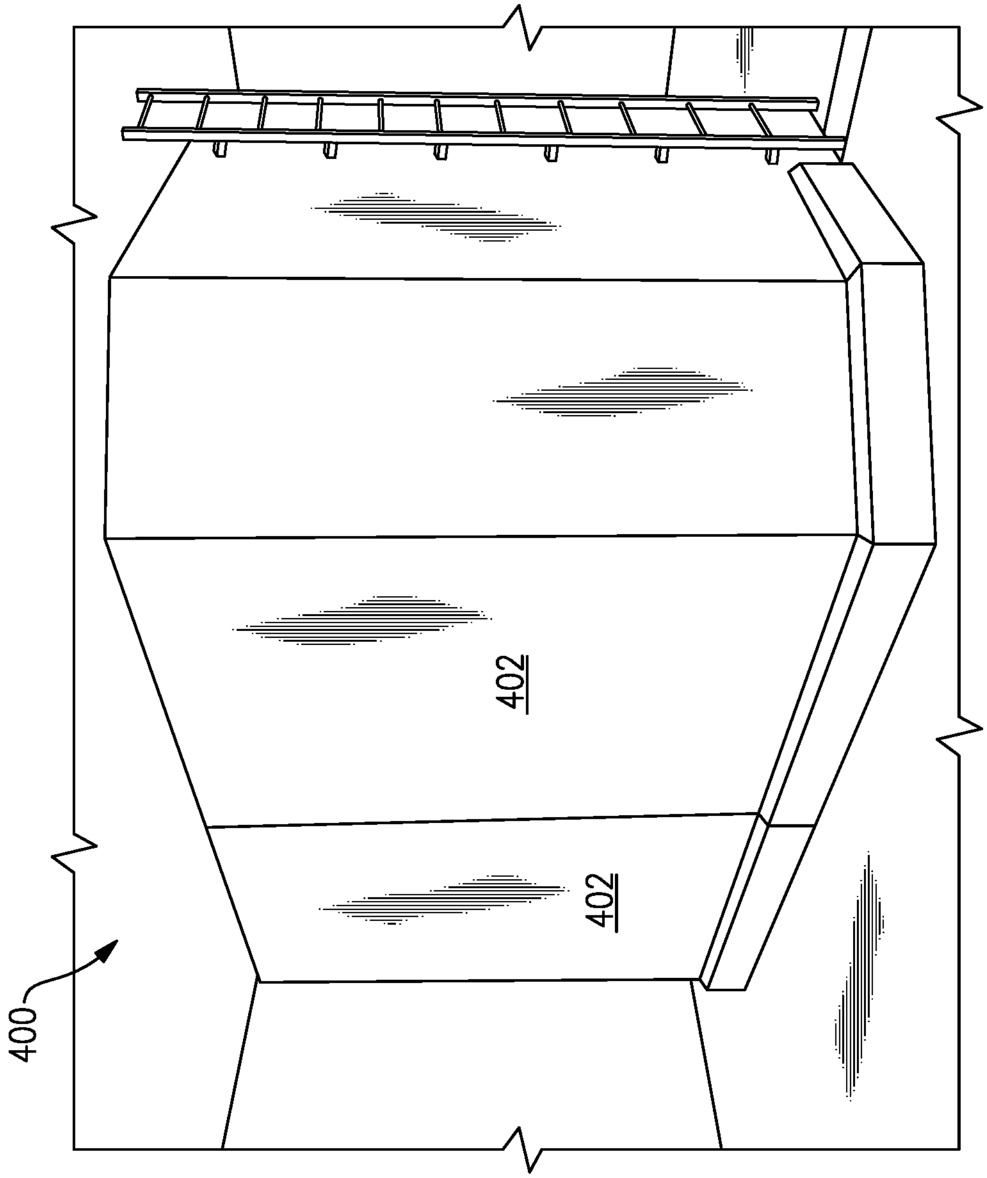
FIG. 4 is a photograph, taken in front-perspective view, of the conventional radioisotope production system shown in FIG. 3, shown in a closed configuration.

A further conventional radioisotope production system is shown in FIG. 3. Radioisotope production system 300 includes cyclotron 318, moveable shields 302, stationery shield 304 and driving units 306. Cyclotron 318 is positioned between movable shields 302. Moveable shields 302 operate like doors, via driving units 306 and when open to expose cyclotron 18. When closed, moveable shields 302, along with stationery shield 304, surround and contain cyclotron 18. That is, taken together, moveable shields 302 and stationery shield 304 constitute a housing 307 for cyclotron 318, wherein housing 307 serves as a shield to the radiation generated therein. Moveable shields 302 are hingedly attached to stationery shield 304. Driving units 306 can be provided on an exterior surface 309 of housing 307 and operated via hydraulics, pneumatics, or electric motor to extend a telescoping piston in order to pivot to rotate moveable shields 302 open and closed. Moveable shields 302 as well as stationery shield 304 can be configured as semi-hollow tanks which may be filled with a medium (e.g. water mixed with boron and lead) to increase the density of the structure and thereby enhance the shielding effect. To offset the increased weight from the filled tanks, inflatable (e.g. air) cushions 308 can be provided on the bottom surfaces of moveable shields 302 to reduce friction and facilitate gliding of moveable shields 302 during the opening/closing movement.

In operation, the cyclotron 318 generates a particle beam that bombards target material (not shown) located within a target enclosure (not shown) within the radioisotope production system 300 to produce a radioactive isotope which then decays. The decay of the isotope generates gamma and neutron radiation. The release of this radiation to the environment external to radioisotope production system 318 is reduced by moveable shields 302 and stationery shield 304 to protect personnel in the vicinity of radioisotope production system 300 against unsafe levels of radiation.

While the housing of conventional radioisotope production system 300 thus provides adequate shielding to radiation attempting to penetrate laterally or horizontally through moveable shields 302 and/or stationery shield 304, the shielding provided may be insufficient to prevent radiation attempting to penetrate vertically through exterior surface 309 of the radioisotope production system 300. Furthermore, conventional cyclotrons (e.g. General Electric PETtrace 880 model) are configured with the target material angled upwardly such that a radiation beam trajectory is oriented, at least partially, in a vertical direction (as shown by dashed line “A” in FIG. 3). Consequently, some amount of radiation is directed towards exterior surface 309 of radioisotope production system 300.

Exacerbating the risk of radiation leak/escape is the shape of moveable shields 302 which can include chamfered or faceted edges 311, along the surface(s) that mate with stationery shield 304. In other words, chamfered or faceted edges 311 of moveable shields 302, when closed, end up positioned in line with the trajectory of the radiation beam “A”—with the gaps formed between the exterior surfaces 309*a* of moveable shields 302 and exterior surface 309*b* of stationery shield 304. serving as voids which can allow radiation beam A to escape housing 307.

Thus, in accordance with an aspect of the present disclosure, a shielding apparatus is provided above moveable shields 302 and stationery shield 304 to inhibit/prohibit escape of radiation beam A. In an exemplary embodiment, the shielding apparatus can include a shield layer that is attached to exterior surface 309 of housing 307. The shielding can include a plurality of layers provided on top of each other in a stack configuration. Each layer can be independently removable/replaceable, and can be formed of metal (e.g. steel, lead, aluminum) and borated polyethylene which serves to shield against gamma and neutron radiation generated during use radioisotope production system 318. For purpose of illustration and not limitation, the boron content of the borated polyethylene can be varied across a range, with an exemplary embodiment containing approximately 5% boron.

Figure 5:
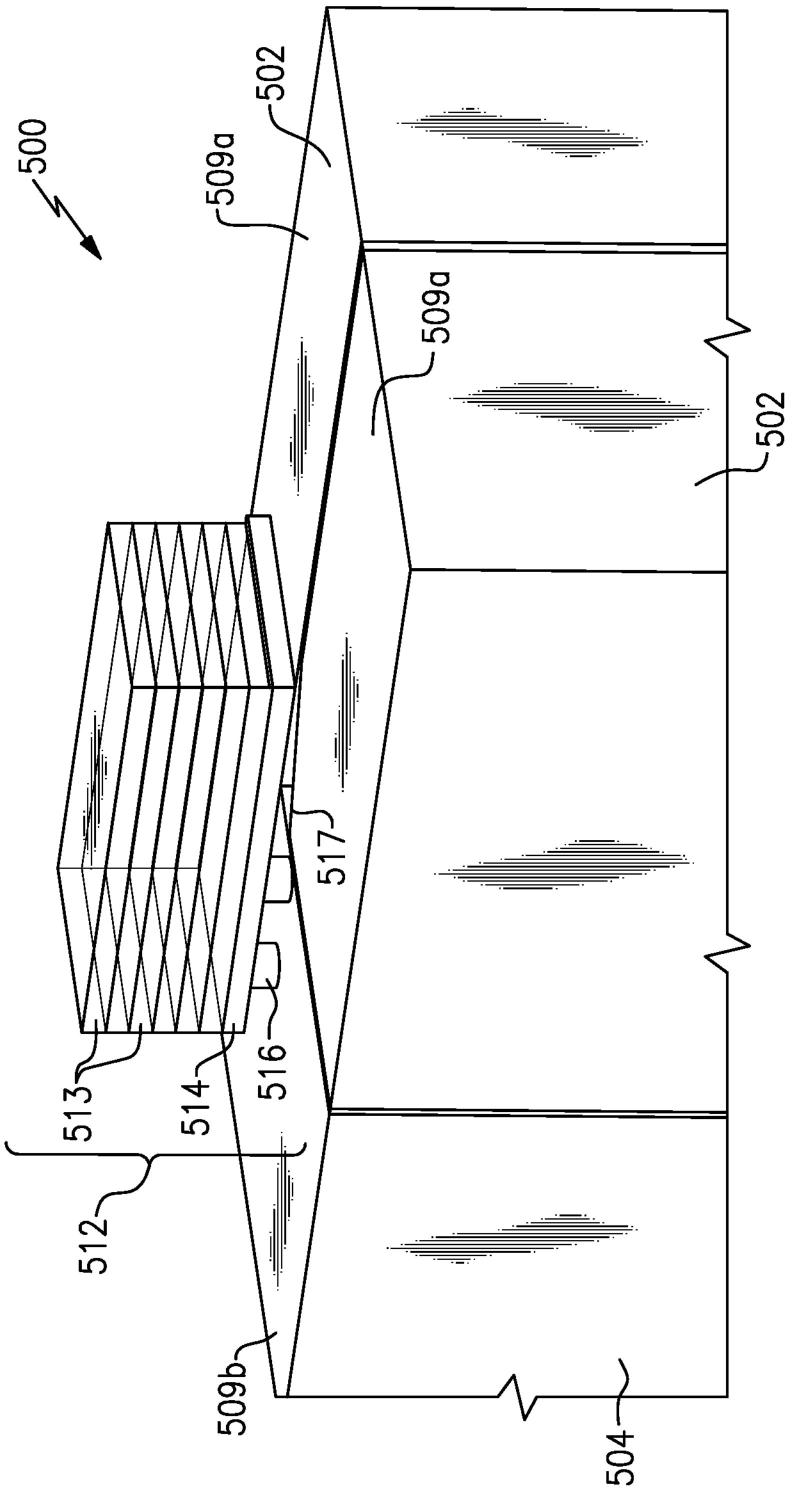
FIG. 5 is a schematic representation of an exemplary embodiment of the shielding apparatus disposed on an exterior surface of a radioisotope production system.

As shown in FIG. 5, shielding apparatus 512 includes a plurality of shield layers 513 having a planar configuration, however alternative designs are within the scope of the present disclosure. In the embodiments shown in FIGS. 5 and 7, six discrete shield layers 513, 713 are stacked to provide shielding apparatus 512, 712.

Figure 6:
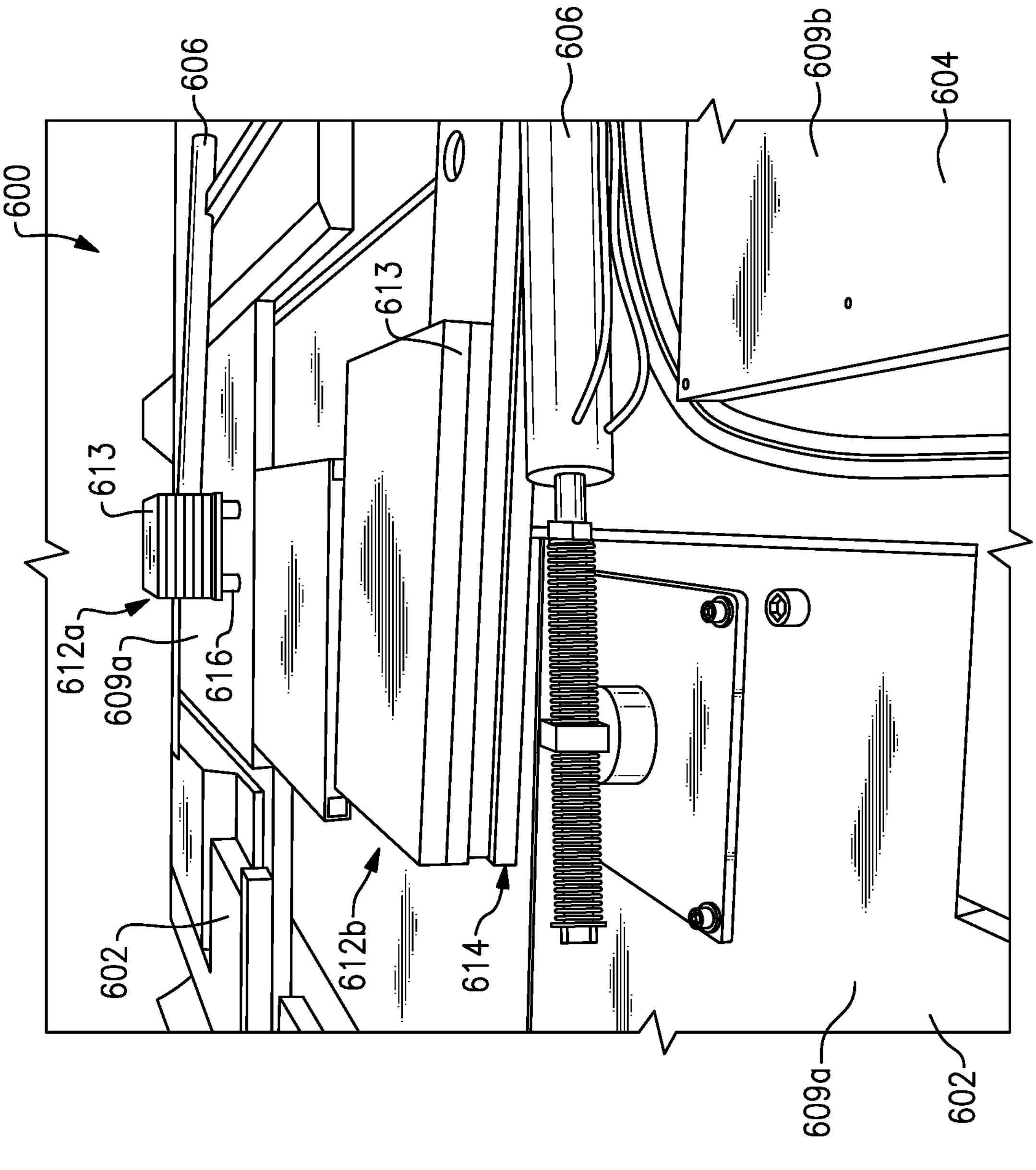
FIG. 6 is a photograph, taken in top-perspective view, of multiple embodiments of the shielding apparatus disposed on an exterior surface of a radioisotope production system.

The number of shield layers employed can be varied with respect to the location of the one or more shielding apparatus on the housing of the radioisotope production system. For example, FIG. 6 depicts shielding apparatus 612*a* and shielding apparatus 612*b*. Shielding apparatus 612*a* comprising more shielding layers 613 than shielding apparatus 612*b* as shielding apparatus 612*a* is positioned on the target side of the housing (i.e. where the target material (not shown) is bombarded to form the desired isotope). The target side is exposed to a greater amount of radiation and neutron leakage thereby requiring more shield layers 613 than shield apparatus 612*b* on the opposite side of housing 607.

Each shield layer 513, 613,713 incrementally reduces neutron and gamma radiation emitted during operation of the radioisotope production system. As previously noted, each shield layer 513,613,713 can be independently removed or replaced. Each shield layer 513,613,713 can be comprised of the same, or different, materials. That is, shield apparatus 512,612*a*,612*b*,712 can be comprises of homogeneous or non-homogeneous shield layers 513,613,713. For example, a shielding apparatus 512,612*a*,612*b*,712 can be provided which exhibits a gradient in the shielding characteristics with the degree of shielding provided by each shield layer 513,613,713 decreasing along the height of shielding apparatus 512,612*a*, 612*b*,712.

The interchangeability of shield layers 513,613,713 allows for upgrading or retrofitting of shield apparatus 512,612*a*,612*b*,712 to provide sufficient shielding appropriate for radioisotope production systems 500,600,700 having higher or lower radiation energies. Similarly, the size and/or shape of the shield apparatus' 512,612*a*,612*b*,712 can be adjusted to accommodate different sizes of housings cyclotron housings 507,607,707. This allows arrangements of the disclosed shielding apparatus that are specifically designed for the radiation emitted from specific radioisotope production system configurations.

Figure 7:
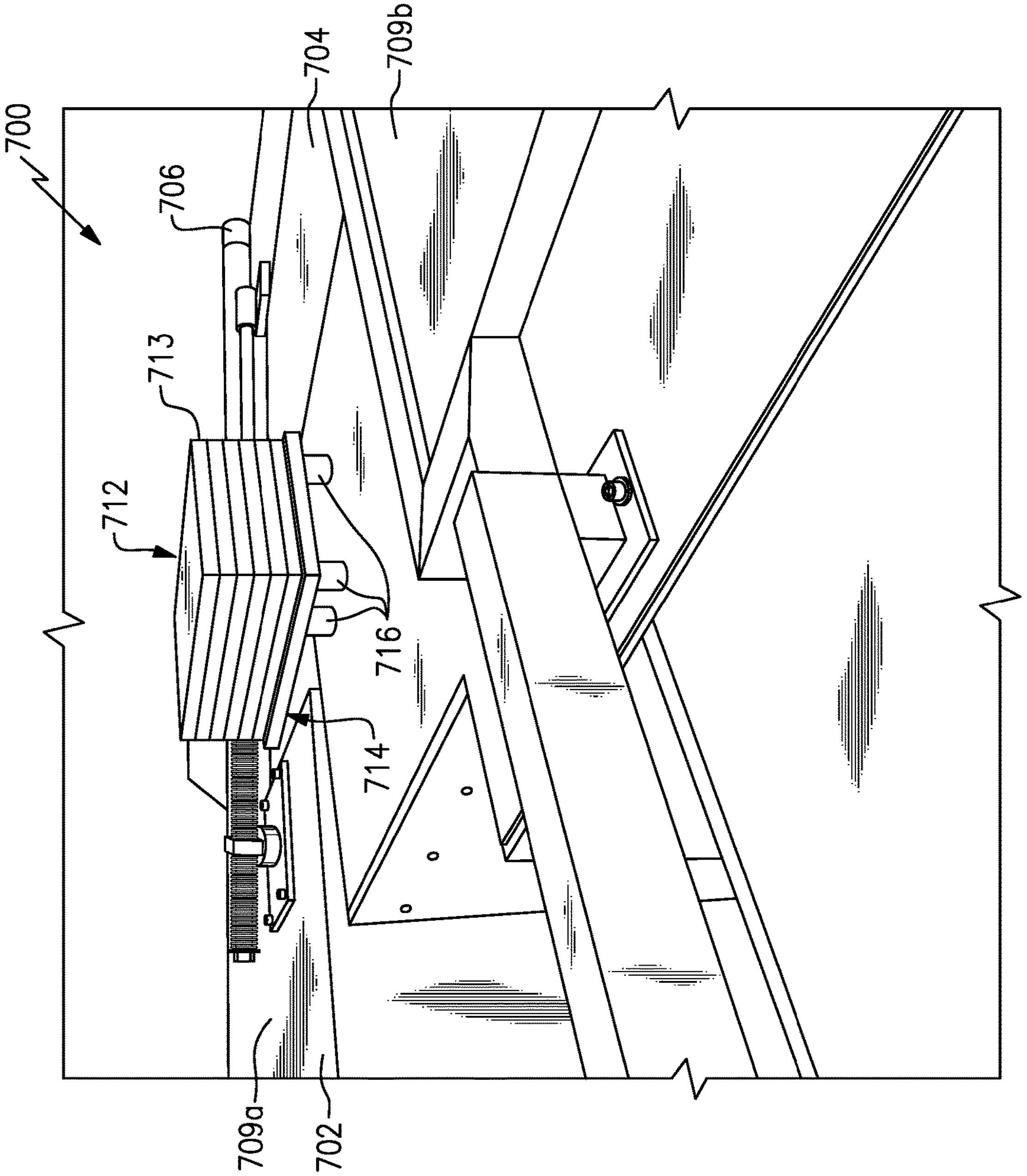
FIG. 7 is a photograph, taken in top-right perspective view, of an embodiment of the shielding apparatus disposed on an exterior surface of a radioisotope production system.

As shown in FIGS. 5-7, shield layers 513,613,713 are positioned on top of a base or pedestal 514,614,714. In the embodiments shown, base 514,614,714 is configured with the same dimensions as the stacked shield layers 513,613, 713. Base 514,614,714 can be formed of any material of sufficient strength and rigidity (e.g. steel, aluminum) to support the weight of the stacked shield layers 513,613,713. Base 514,614,714 can be removably, or permanently attached exterior surfaces 509,509*a*,509*b*,609,609*a*,609*b*, 709,709*a*,709*b* of housing 507,607,707, e.g., via the bolt pattern associated with moveable shield 503,603,703 construction/assembly (e.g. base 514,614,714 can be attached via a retrofit to preexisting hardware on housing 507,607, 707 of radioisotope production systems 500,600,700)

Base 514,614,714 can be mounted on spacers 516,616, 716, as shown in FIGS. 5-7. As previously noted, spacers 516,616,716 can be configured to adapt to preexisting hardware of the radioisotope production system. Spacers 516, 616,716 can be formed of a variety of materials, e.g. nylon, provided spacers 516,616,716 exhibit sufficient rigidity to support the weight of shield layers 513,613,713, and base 514,614,714. For example, spacers 516,616,716 can be configured for placement where pre-existing holes & fixtures (screws/nuts) of driving units 606,706 (not shown in FIG. 5) reside. Also, the height of the spacers 516,616,716 can be sized to accommodate any elevation in moveable shields 502,602,702 caused by inflation of optional cushions (not shown in FIGS. 5-7). In one embodiment, spacers 516,616,716 are approximately two inches in height and two inches in diameter, sufficient to permit moveable shields 502,602,702 to rotate open and closed. Thus, shielding apparatus 512,612*a*,612*b*,712 can be retrofitted onto existing radioisotope production systems, while permitting the normal operation of moveable shields 502,602,702 to open and close without interference by shielding apparatus 513,613, 614 components (e.g. spacers 516,616,716, base 514,614, 714 or shield layers 513,613,713).

The number and placement of spacers 516,616,716 can vary depending on the size of shielding apparatus 512,612*a*, 612*b*,712. In some embodiments, spacers 516,616,716 can all be mounted on a single component of the radioisotope production system. For example, spacers 516,616,716 can extend vertically from only moveable shields 502,602,702 and not be present on stationery shield 504,604,704. Additionally, or alternatively, spacers 516,616,716 can extend vertically from only stationery shield 504,604,704 and not be present on moveable shields 502,602,702. Positioning all spacers 516,616,716 on a single component allows for unimpeded relative movement between moveable shields 502,602,702 and stationery shield 504,604,704 (i.e. moveable shields 502,602,702 can continue to rotate outwardly with respect to stationery shield 504,604,704, if spacers 516,616,716 were permanently mounted on both moveable shields 502,602,702 and stationery shield 504,604,704, they would prohibit relative movement). Additionally, spacers 516,616,716 serve to elevate shielding apparatus 512,612*a*, 612*b*,712 to create a gap or space between housing 507,607, 707 and base 514,614,714. This gap allows a flow of cooling air to pass underneath shielding apparatus 512,612*a*,612*b*, 712 thereby reducing any localized elevated temperatures experienced by shielding apparatus 500,512,612*a*,612*b*,712 due to capture of or impingement by the radiation beam "A".

Although spacers 516,616,716 can all be positioned on a single component of the radioisotope production system (moveable shields 502,602,702 or stationery shield 504,604, 707) base 514,614,714 is sized and positioned to extend over the gap formed between two adjacent components of the radioisotope production system. For example, base 514,614, 714 and corresponding shield layers 513, 613,713 can be attached to stationery shield 504,604,704 proximate the chamfered/faceted edge (not shown in FIGS. 5-7) such that any radiation emitting through the space formed between moveable shields 502,602,702 and stationery shield 504, 604,704 impinges upon shielding apparatus 512,612*a*,612*b*, 712 which is positioned directly in line with the trajectory of radiation beam "A". Accordingly, spacers 516,616,716 can be distributed in an equidistant manner across a lower surface of base 514,614,714. In some embodiments, spacers 516,616,716 can be distributed in a non-uniform manner across the lower surface of base 514,614,714, e.g., spacers 516,616,716 can be concentrated in select region(s) while leaving other regions (such as corner 517 shown in FIG. 5) free of spacers 516,616,716. This configuration allows for a concentration or clustering of spacers 516,616,716 to provide sufficient structural support to carry the weight of shield layers 513,613,713, while keeping moveable shields 502, 602,702 free from structural connection to base 514,614,714 which could inhibit/prohibit relative movement of moveable shields 502,602,702. In such configurations, base 514,614, 714 and shield layers 513,613,713 can be stacked so as to overhang or project outwardly over the interface between moveable shields 502,602,702 and stationery shield 504, 604,704 to block radiation leakage.

Alternatively, shielding apparatus 512,612*a*,612*b*,712 can be attached to moveable shields 502,602,702 and extend over the space formed between the interface between moveable shields 502,602,702 and stationery shield 504,604,704 such that any radiation emitting through the space formed between moveable shields 502,602,702 and stationery shield 504,604,704 impinges upon shielding apparatus 512,612*a*, 612*b*,712 which is positioned directly in line with the trajectory of radiation beam "A" Shielding apparatus 512, 612*a*,612*b*,712 can be positioned at a location adjacent to driving units 606,706 (not shown in FIG. 5), and employ existing hardware for attachment to housing 507,607,707.

The various embodiments disclosed herein are sufficient for shielding against radiation emitted during operation of a cyclotron having an energy level of approximately 16.5 MeV such as a General Electric PETtrace™ 880 cyclotron.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

The invention claimed is:

1. A shielding apparatus for a radioisotope production system having a housing comprising a stationery shield and movable shields configured for relative movement therebetween, the shielding apparatus comprising:

at least one shield layer, the at least one shield layer disposed above the housing;

a base having a top surface and a bottom surface defining a width therebetween, the at least one shield layer disposed on the top surface of the base;

at least one spacer, the at least one spacer attaching the base to the housing with a gap between the bottom surface of the base and the housing;

wherein the at least one shield layer is removably attached to the base.

2. The shielding apparatus of claim 1, wherein a plurality of shield layers are stacked symmetrically on top of the base.

3. The shielding apparatus of claim 1, wherein the at least one shield layer includes a plurality of homogenous shield layers.

4. The shielding apparatus of claim 1, wherein the at least one shield layer is disposed above a moveable shield throughout the range of motion of the moveable shield.

5. The shielding apparatus of claim 1, wherein the base and the at least one shield layer extend between a moveable shield and the stationery shield.

6. The shielding apparatus of claim 1, wherein the base and the at least one shield layer are disposed within the trajectory of a radioisotope production system radiation beam.

7. The shielding apparatus of claim 1, wherein all the spacers are disposed on the stationery shield.

8. The shielding apparatus of claim 1, wherein all the spacers are disposed on a moveable shield.

9. The shielding apparatus of claim 1, wherein at least one spacer is disposed proximate each edge of the base.

10. The shielding apparatus of claim 1, wherein at least one spacer is disposed proximate each corner of the base.

11. The shielding apparatus of claim 1, wherein all spacers are spaced from at least one corner of the base.

12. The shielding apparatus of claim 1, wherein the base is removably attached to the housing.

13. The shielding apparatus of claim 1, wherein the at least one shield layer shields against neutron and gamma radiation.

14. The shielding apparatus of claim 1, wherein the at least one shield layer is formed from borated polyethylene.

15. The shielding apparatus of claim 1, wherein the at least one shield layer is configured as a rectangular plate.

16. The shielding apparatus of claim 1, wherein the gap between the bottom surface of the base and the housing is a constant distance.

17. The shielding apparatus of claim 1, wherein the gap between the bottom surface of the base and the housing is a varied distance.

18. The shielding apparatus of claim 1, wherein the gap between the bottom surface of the base and the housing is at least approximately 2 inches at a first location of the base.

19. The shielding apparatus of claim 1, further comprising a second base disposed above the cyclotron housing, the second base including at least one shield layer disposed thereon, wherein the second base is spaced from a first base.

20. The shielding apparatus of claim 19, wherein the first base includes a first number of shield layers disposed thereon, and the second base includes a second number of shield layers disposed thereon, with the first number of shield layers being different than the second number of shield layers.

* * * * *